Oct. 30, 1951     R. RULON-MILLER     2,573,222
SADDLE FOR SPINNING FRAMES
Filed Dec. 19, 1947
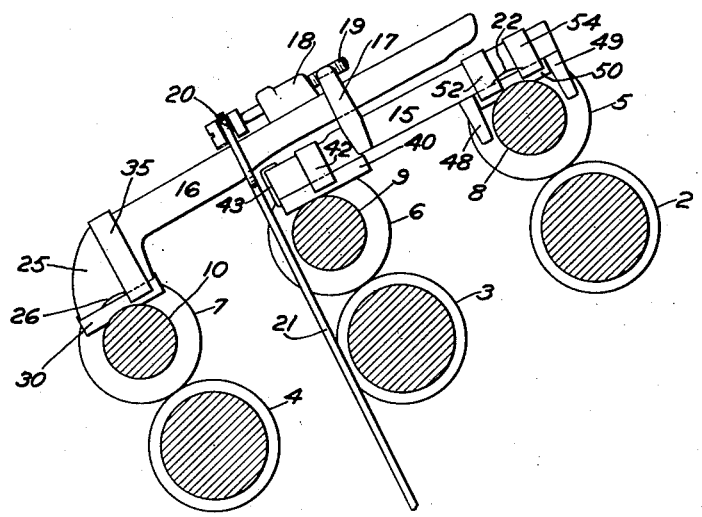
*Fig. 1.*
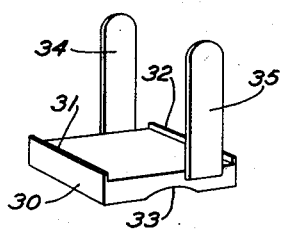    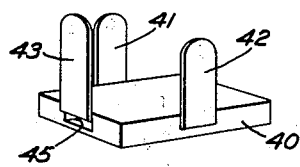    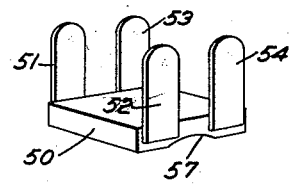
*Fig. 2.*     *Fig. 3.*     *Fig. 4.*
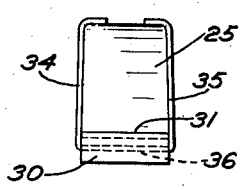    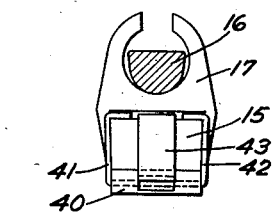    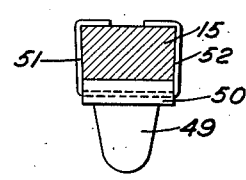
*Fig. 5.*     *Fig. 6.*     *Fig. 7.*
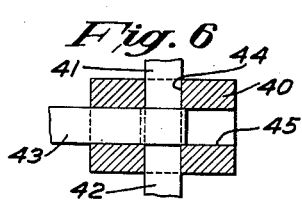    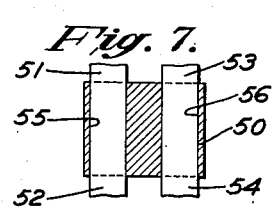
*Fig. 8.*     *Fig. 9.*     *Fig. 11.*
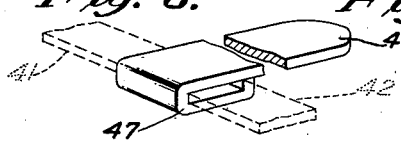
*Fig. 10.*
Inventor:
Robert Rulon Miller
By *[signature]*
Attorneys Patented Oct. 30, 1951

2,573,222

UNITED STATES PATENT OFFICE 2,573,222

SADDLE FOR SPINNING FRAMES

Robert Rulon-Miller, Bristol, R. I., assignor to Dixon Lubricating Saddle Company, Bristol, R. I., a corporation of Rhode Island Application December 19, 1947, Serial No. 792,812

4 Claims. (Cl. 19—137)

This invention relates to saddles for weighting the top rolls of spinning frames to secure their coaction with the bottom rolls and consists particularly of improved bearing elements attachable to the saddle for reducing friction and wear between the saddle and the arbors of the rolls.

One object of the invention is to provide an improved bearing element of friction-reducing and wear-resisting material with means for readily attaching it in operative position on the saddle either as initial equipment or to replace a worn bearing.

Another object is to provide an improved bearing element adapted for use with practically all types of saddles and having means for securely fastening it to the saddle by simply strapping it thereto without the use of tools.

Another object is to provide a bearing element of friction-reducing and wear-resisting material having pliable straps attached thereto and adapted to straddle the sides of the saddle and be folded across the top thereof to secure the bearing element in place.

Another object is to provide a bearing element of friction-reducing and wear-resisting material having bendable metal straps inserted through slots or openings in the element and projecting upwardly therefrom for folding across the top of the saddle to fasten the element thereto.

Another object is to provide a novel arrangement of the straps on different bearing elements to provide for fastening them to parts of the saddle having different conformations while maintaining the bearings against displacement thereon.

Further objects of the invention are set forth in the following specification which describes a conventional arrangement of drawing rolls and the saddle assembly therefor with the present improved bearings applied to use therewith as shown by the accompanying drawing. In the drawing:

Fig. 1 is a transverse sectional view taken through the arbors of a set of drawing rolls and illustrating the saddle for the top rolls as provided with the present improved bearings;

Fig. 2 is an enlarged perspective view of the attachable bearing element for the front top roll;

Fig. 3 is a similarly-enlarged perspective view of the attachable bearing element for the middle or third top roll;

Fig. 4 is a perspective view of the attachable bearing element for the back top roll;

Fig. 5 is a front elevational view of the forward end of the front saddle showing the present improved bearing element attached thereto;

Fig. 6 is a front view of the middle bearing element shown with the front saddle in transverse section taken at a point substantially midway of its ends;

Fig. 7 is a part-sectional view through the rearward end of the back saddle showing the bearing element for the back top roll as applied thereto;

Fig. 8 is a sectional plan view of the front top roll bearing element showing the slot therein for receiving the attaching or holding strap;

Fig. 9 is a sectional plan view of the middle top roll bearing element showing the slots for receiving two connected attaching straps;

Fig. 10 is a still further enlarged detailed view showing the manner in which the attaching straps are interconnected within the slots of the middle top roll bearing element; and Fig. 11 is a sectional plan view of the bearing element for the back top roll shown as having two slots for receiving the pair of attaching or holding straps.

Spinning frames as usually constituted are provided with plural sets of top and bottom rolls journaled in bearings with the top rolls alined in parallel relation to the bottom rolls for cooperation therewith to draft the material passing between the peripheries of the rolls. The top rolls are constituted by cylindrical bosses connected in pairs by means of arbors which may be integral therewith or in the form of a spindle or shaft passing through axial bores therein. The top rolls of each pair are provided with trunnions at their outer ends journaled in spaced, slotted bearings in a cap-bar that is pivotally mounted at its rearward end on a rod extending the length of the machine. The top rolls may have their peripheries provided with coverings or cots of leather, cork or the like, not herein shown, and are weighted by means of an overlying saddle to cause them to bear against the peripheries of the bottom rolls. The saddle is usually formed with bearing faces on its under side engaging the arbors between the bosses of the rolls and is weighted by means of a stirrup depending therefrom. The stirrup is connected to a pivoted weight-lever carrying a weight-hook at its end on which are suspended a suitable weight or weights. Heretofore, it has been usual to construct the saddles of malleable-, cast-iron or the like and provide pockets or cups in their upper faces with oil-holes leading therefrom for lubricating the bearings. With such means of lubrication lint and dust are liable to collect in the oil-pockets and holes to prevent the oil feeding to the bearings, thereby resulting in excessive friction and wear thereon even though the lubricating ducts may be cleaned frequently. Friction and wear between the hardened steel arbor and the bearing surfaces on the iron saddle may be severe and consequently frequent replacement of the saddles becomes necessary.

It is therefore an object of the present invention to provide a friction-reducing and wear-resisting bearing for saddles of various types and one which may be readily attached to the parts of the saddle either as initial equipment or for repair thereof when the original bearings become worn. It is a further object of the invention to provide a bearing element having its attaching means readily detachable from the saddle to provide for its removal and replacement.

Referring to the present drawing, Fig. 1 illustrates a single set of spinning rolls comprising a bottom back roll 2, an intermediate or third bottom roll 3 and a front bottom roll 4, each shown in transverse sectional view in a plane bisecting the arbor of each pair. Cooperating with the bottom rolls 2, 3 and 4 are three top rolls 5, 6 and 7, also shown in transverse sectional view in planes bisecting the arbors 8, 9 and 10 which connect the two bosses of each pair. The present arrangement of the rolls is common to various types of spinning frames and the means for mounting the rolls in their journals is omitted from the drawing for the sake of simplicity and a clearer showing of the parts of the present invention comprising the saddle and the improved bearings attached thereto.

The saddle assembly shown in Fig. 1 of the present drawing is of conventional type comprising a back saddle 15 with a front saddle 16 joined thereto to provide bearings for the three top rolls 5, 6 and 7. The joint between the two elements of the saddle may consist of a lug 17 projecting upwardly from the back saddle 15 and bifurcated at the top to provide a fork for receiving the rearward portion of the front saddle 16 more or less loosely, see Fig. 6, to permit play between the parts and adapt them for independent movement relatively to each other. Threaded through an enlargement or lug 18 projecting upwardly from the front saddle 16 is a screw or stud 19 having an annularly slotted head 20 at its end for receiving a stirrup 21 hooked thereto and depending therefrom for connection with a weighted lever, not herein shown. By adjusting the stud 19 through the lug 18 the position of the stirrup longitudinally of the front saddle 16 may be altered to vary the effect of the weight on the several bearings for the rolls; that is, to apply the weight at a point either toward or away from the front end of the saddle to increase or reduce the pressure on the bearing for the front roll 7. The back saddle 15 is usually provided with a concave bearing recess 22 for the arbor 8 of the roll 5 and a flat bearing face for the arbor 9 of the roll 6 and the front saddle 16 is formed with an enlarged head 25 having a concave recess or bearing surface 26 for the arbor 10 of the front roll 7. As before indicated it is these bearing surfaces that are subject to considerable friction and severe wear, especially the front bearing, and the present invention contemplates the provision of friction-reducing and more durable bearing elements therefor. The arrangement of the drawing rolls and saddle assembly as above described and shown in Fig. 1 of the drawing is merely illustrative and it is to be understood that the present invention may be applied to other arrangements and forms of the rolls and different types of saddles. For example, in some cases a one-piece or single saddle is used in place of the present assembly where only two drawing rolls are concerned and the present improvement is applicable to such a variation or any other different form of construction used in the present art.

Referring to the perspective views, Figs. 2, 3 and 4, the present improved bearing elements are preferably constructed in several different forms to more particularly adapt them to the bearings which they replace. Each of the bearing elements may be in the form of a plate or block constructed from friction-reducing and wear-resisting material such as brass, bronze, one of the commercial types of oil or graphite impregnated substances, or any other suitable material. The front bearing element 30 may take the form of a rectangular flat plate dimensioned to fit beneath the head 25 at the forward end of the front saddle 16 and having ledges or flanges 31 and 32 projecting upwardly from its upper face for engagement with the forward and rearward sides of the head to maintain the bearing element from longitudinal displacement when applied thereto. The under face of the bearing element 30 may be milled, ground or otherwise formed with an accuate concavity 33 or recess of a radius to accurately conform to the circumference of the arbor 10 of the front roll.

In accordance with the present invention the means for attaching the bearing elements severally to the different parts of the saddle assembly comprises, in general, a plurality of pliable or bendable straps reaching upwardly from their sides and adapted to be folded inwardly across the top of the saddle. In the preferred embodiment of the invention as herein illustrated the front bearing element 30 is provided with two straps 34 and 35 projecting upwardly from its opposite sides and adapted to be folded inwardly across the top of the head 25 on the front saddle 16 as shown more particularly in Fig. 5 of the drawing. As one feature of the present invention the straps for attaching the bearing elements to the saddle are connected to said elements in a novel and ingenious manner as next explained.

Referring first to Figs. 2 and 5, the straps 34 and 35 for the front bearing element 30 are constructed from pliable or bendable metal, such as soft brass or the like, with each pair formed in one continuous strip held in a transverse slot 36, cored or otherwise provided in the element. The slot 36 is located toward the rearward end of the bearing element 30 with the straps 34 and 35 folded upwardly at its sides in position to straddle the sides of the head 25 of the front saddle 16; it being understood that the bearing element is of a width corresponding to that of the head. The bearing element 30 is placed in abutting relation to the under side of the head 25 with the flanges 31 and 32 engaging the forward and rearward sides thereof and the straps 34 and 35 straddling the sides of the head in close fitting contact therewith. Then to fasten the bearing element 30 in place the upper portions of the straps 34 and 35 may be easily folded across or around the top portion of the head 25 and pressed downwardly thereagainst. In this way the front bearing element 30 is very easily and conveniently attached to the front saddle 16 with little danger of its becoming disconnected therefrom since in use its concavity 33 will be held in contact with the periphery of the arbor 10 for the roll 7 under the weight applied to the saddle.

For the intermediate or so-called third roll 6 the bearing element 40 may have a slightly different form of construction for attaching it to the forward end of the back saddle 15. As shown in Figs. 3 and 6, the bearing element 40 is provided with two straps 41 and 42 at its side and a third strap 43 at its forward end. The two straps 41 and 42 of pliable or bendable material are constructed in one continuous strip inserted through a transverse slot 44 located substantially midway between the ends of the bearing element 40. On the other hand, the front strap 43 is fastened to the bearing element 40 in an ingenious manner by passing it through a longitudinal slot 45 of greater depth than the transverse slot 44 and connecting it to the transverse length of the straps 41 and 42. Referring to Figs. 9 and 10, the end of the strap 43 inserted into the slot 45 is folded over or doubled on itself to provide a flat loop 47, shown in enlarged perspective view in Fig. 10, through which the transverse length of the straps 41 and 42 is inserted to anchor the forward or front strap in place. After the straps 41, 42 and 43 have been applied to the bearing element 40 as explained and their projecting portions bent upwardly at its sides they will be held securely for attaching the element to the forward end of the back saddle 15 by merely folding their ends across the top of the latter as shown in Figs. 1 and 6. It is preferable that the lower contact face of the bearing element 40 be not scored or otherwise formed with a concavity so that its flat face may bear directly against the arbor 9 of the roll 6. This particular bearing element will then require no adjustment longitudinally of the back saddle 15 should there be any slight variations in the distance between the axes of the middle roll 6 and the back roll 5.

The back saddle 15 is usually provided with a pair of downwardly-projecting prongs or lugs 48 and 49 which straddle the sides of the arbor 8 for the back roll 5 and these lugs may be used as convenient means for locating the back bearing element 50 to prevent its displacement longitudinally of the back saddle. As herein shown the back bearing element 50 is provided with four straps 51, 52, 53 and 54 arranged in pairs projecting upwardly from its sides, although in some cases only one pair of straps may be sufficient to attach the element to the back saddle 15. In the preferred form of construction shown in Figs. 4, 7 and 11, however, four straps are used with those of each pair made continuous in one strip and inserted through slots 55 and 56 as shown most clearly in Fig. 11. With this form of construction of the rearward or back bearing element 50 it is only necessary to place it in position between the lugs 48 and 49 at the rearward end of the back saddle 15 with the straps 51, 52, 53 and 54 straddling the sides of the saddle, whereafter the ends of the straps are folded downwardly against the top of the saddle as shown in Fig. 7 to securely attach the bearing element in place. Preferably, the rearward or back bearing element 50 is formed with an arcuate recess 57 on its under side of a radius corresponding to that of the arbor 8 of the back roll 5, although this is not essential to the operation of the device.

With the several bearing elements 30, 40 and 50 attached to the saddle assembly in the manner as above explained and the saddle weighted by means of the stirrup 21 and the cooperating lever and weights, not shown, the several bearing elements 50, 40 and 30 will engage the arbors 8, 9 and 10, respectively, of the rolls 5, 6 and 7 and provide for long service by reducing the friction at the contact surfaces and also the wear thereon due to the lubricating characteristics of the bearing elements. Therefore, saddles provided with the improved bearing elements of the present invention may be used continuously over long periods of time without repair or replacement. Moreover, should the bearing elements eventually show any considerable wear they may be detached and replaced by others of the same type to provide for practically limitless endurance. In replacing the bearing elements the original straps may be used for attaching them to the saddles.

As another advantage of the present invention the improved bearing elements may be applied to use with saddles which have become so worn at their bearing points as to necessitate discarding them. That is to say, instead of replacing the saddle itself its bearings may be renewed by applying the present improved bearing elements thereto by the simple and convenient attaching means provided therewith. In this way the life of the saddles may be extended indefinitely with the further advantage of reducing the friction at the bearing points and saving wear on the roll arbors. As a still further advantage, by forming the bearings of material having lubricating characteristics, oiling of the bearings becomes unnecessary and consequently less attention is required and collection of dust and lint on the parts is eliminated.

It will be observed from the foregoing specification that the present invention provides an important improvement in the art consisting in a novel and ingenious means for renewing the bearings on saddles of various types used on spinning frames; that is, by attaching friction-reducing and wear-resisting bearing elements thereto. It is further noted that the present improved bearing element and its novel attaching means may be applied to other uses for renewing the bearings on the parts of textile and other machines within the purview of this invention.

While the invention is herein shown as embodied in a preferred form of construction with the attaching means for the bearing elements varying in arrangement, it is to be understood that further modifications may be made in the form and arrangement of the parts of the device without departing from the spirit of the invention or the scope of the appended claims. Therefore, without limiting myself in this respect, I claim:

1. A bearing element for the saddles or like members of textile machines comprising a piece of friction-reducing and wear-resisting material having an elongate slot extending through its sides and a strip of pliable material inserted through said slot with its ends projecting upwardly to provide bendable straps adapted to overlie the sides of the saddle or other part with their ends folded across the top thereof to fasten the bearing element in operative position thereon.

2. A readily attachable and detachable bearing element for the saddles or other bearing parts of textile machines consisting in a piece of friction-reducing and wear-resisting material having a plurality of strips of pliable material inserted through laterally and longitudinally-extending openings in the bearing element with extensions thereof projecting upwardly from its sides to adapt their ends to be bent across the top of the saddle or other part to fasten the element in operative position thereon.

3. A bearing element for the saddles or other bearing members of textile machines comprising a piece of friction-reducing and wear-resisting material having a plurality of slots extending transversely through its sides, and a plurality of strips of relatively thin pliable material inserted through the slots and bent upwardly at the sides in the form of straps adapted to straddle the sides of the saddle or other part with their ends folded across the top thereof to attach the bearing element in operative position thereon.

4. A bearing element for the saddles and other bearing members of textile machines comprising a piece of friction-reducing and wear-resisting material having a slot extending transversely therethrough from its sides and a second slot extending longitudinally therethrough from its ends, a strip of relatively thin pliable material inserted through one of the slots, and a second strip of equivalent material inserted into the other slot and having a loop at its end through which the first strip projects to fasten the strips to the element in position to be bent upwardly and folded across the top of the saddle or other part to attach the bearing element in place thereon.

ROBERT RULON-MILLER.

REFERENCES CITED

The following references are of record in the file of this patent:

UNITED STATES PATENTS

| Number | Name | Date |
|---|---|---|
| 347,910 | Young et al. | Aug. 24, 1886 |
| 2,075,484 | Truslow | Mar. 30, 1937 |
| 2,289,628 | Conant et al. | July 14, 1942 |